(12) United States Patent
Koga et al.

(10) Patent No.: US 6,965,751 B2
(45) Date of Patent: Nov. 15, 2005

(54) ROLE MANAGED COLLABORATIVE LEARNING SUPPORT SYSTEM AND METHOD

(75) Inventors: Akihiko Koga, Yamato (JP); Tadashi Tanaka, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/059,426

(22) Filed: Jan. 31, 2002

(65) Prior Publication Data

US 2002/0146675 A1 Oct. 10, 2002

(30) Foreign Application Priority Data

Apr. 5, 2001 (JP) ........................................ 2001-106628

(51) Int. Cl.[7] ................................................ G09B 7/00
(52) U.S. Cl. ...................... 434/350; 434/362; 715/753; 709/204
(58) Field of Search ................................ 434/362, 336, 434/350; 715/753; 709/204, 223, 224, 225, 226

(56) References Cited

U.S. PATENT DOCUMENTS

| | | | | |
|---|---|---|---|---|
| 5,008,853 A | * | 4/1991 | Bly et al. ................ | 345/751 X |
| 5,907,831 A | * | 5/1999 | Lotvin et al. ............. | 705/14 X |
| 6,091,930 A | * | 7/2000 | Mortimer et al. ........ | 434/362 X |
| 6,149,441 A | * | 11/2000 | Pellegrino et al. ....... | 434/350 X |
| 6,157,915 A | * | 12/2000 | Bhaskaran et al. ............. | 705/7 |
| 6,201,948 B1 | * | 3/2001 | Cook et al. ................. | 434/350 |
| 6,416,328 B1 | * | 7/2002 | Callahan ................. | 434/322 X |
| 6,438,353 B1 | * | 8/2002 | Casey-Cholakis et al. .. | 434/350 X |
| 6,449,598 B1 | * | 9/2002 | Green et al. ................. | 705/2 X |
| 6,470,171 B1 | * | 10/2002 | Helmick et al. ........ | 434/362 X |
| 6,505,031 B1 | * | 1/2003 | Slider et al. ............. | 434/350 X |
| 6,622,003 B1 | * | 9/2003 | Denious et al. ............. | 434/350 |
| 2001/0043696 A1 | * | 11/2001 | Pinard .................... | 379/265.01 |
| 2002/0031752 A1 | * | 3/2002 | Kouba et al. ................ | 434/219 |
| 2002/0115052 A1 | * | 8/2002 | Anderson et al. ........... | 434/350 |
| 2002/0119435 A1 | * | 8/2002 | Himmel et al. ............. | 434/350 |
| 2002/0177109 A1 | * | 11/2002 | Robinson et al. ........... | 434/118 |
| 2003/0207245 A1 | * | 11/2003 | Parker ........................ | 434/350 |

FOREIGN PATENT DOCUMENTS

| | | |
|---|---|---|
| JP | A-10-214022 | 8/1998 |
| JP | A-2000-99491 | 4/2000 |

OTHER PUBLICATIONS

D. Suthers, et al., "Groupware for developing critical discussion skills" ( CSCL95 Computer Supported Collaborative Learning, Lawrence Eribaum associates, Inc., ISBN 0–8058–2243–7).

* cited by examiner

Primary Examiner—Chanda L. Harris
(74) Attorney, Agent, or Firm—Mattingly, Stanger, Malur & Brundidge, P.C.

(57) ABSTRACT

In a collaborative learning system capable of collaborative learning by operating resources of a server from a plurality of clients, activity model data is used which can express roles and the relation and behaviors between roles. The status of roles of each learner can therefore be monitored. Resource operations and interpretation of the operations of roles are both registered. Resource operations can be added while retaining the role interpretation function.

9 Claims, 13 Drawing Sheets

| OPERATION PATTERN | BEHAVIOR | OBJECT LIST |
|---|---|---|
| WRITE(BOARD, ARTICLE) | WRITE | BOARD |
| WRITE TO(BOARD, ARTICLE, WHO) | DISCUSS | WHO |
| GET(MATERIAL) | REFER | LEARNING MATERIAL |
| ⋮ | ⋮ | ⋮ |

| BEHAVIOR NAME | SUBJECT | OBJECT LIST |
|---|---|---|
| TEACH | TEACHER | LEARNER |
| ACCESS | TEACHER | LEARNING MATERIAL |
| ACCESS | TEACHER | GUIDING MATERIAL |
| ACCESS | LEARNER | LEARNING MATERIAL |
| ACCESS | TEACHER | SHARED AREA |
| ACCESS | LEARNER | SHARED AREA |
| INSTRUCT | TEACHER | LEADER |
| NOMINATE | LEADER | LEARNER |
| DISCUSS | LEARNER | LEARNER |
| DISCUSSION THREAD CREATION | LEADER | SHARED AREA |
| ROLE ALLOCATION | LEADER | LEARNER    TASK DATA |

| BEHAVIOR NAME | SUBJECT | OBJECT LIST | COUNT | HISTORY |
|---|---|---|---|---|
| TEACH | TEACHER | LEARNER | 1 | USER D TEACHES USER B |
| ACCESS | TEACHER | LEARNING MATERIAL | 10 | ... |
| ACCESS | TEACHER | GUIDING MATERIAL | 5 | ... |
| ACCESS | LEARNER | LEARNING MATERIAL | 120 | ... |
| ACCESS | TEACHER | SHARED AREA | 231 | ... |
| ACCESS | LEARNER | SHARED AREA | --- | ... |
| INSTRUCT | TEACHER | LEADER | --- | ... |
| NOMINATE | LEADER | LEARNER | --- | ... |
| DISCUSS | LEARNER | LEARNER | --- | ... |
| FORM THREAD | LEADER | SHARED AREA | --- | ... |
| ROLE ALLOCATION | LEADER | LEARNER TASK DATA | --- | ... |

FIG. 9

| RESOURCE ID | ROLE | ACTIVITY STATUS |
|---|---|---|
| USER A | LEADER | |
| | LEARNER | |
| USER B | LEARNER | |
| USER C | LEARNER | |
| USER D | TEACHER | |

| RESOURCE ID | ROLE | MONITORING CONDITION |
|---|---|---|
| USER A | LEADER | LAPSE TIME > 48 H & ACTIVITY NUMBER < 10 |
| | LEARNER | - - - |
| USER B | LEARNER | - - - |
| USER C | LEARNER | - - - |
| USER D | TEACHER | - - - |

| OPERATION PATTERN | INTERPRETATION METHOD | OPERATION METHOD |
|---|---|---|
| $F(X0, X1, \cdots, Xn)$ | $M(X0, X1, \cdots, Xn)$ | $C(X0, X1, \cdots, Xn)$ |
| ⋮ | ⋮ | ⋮ |

12001

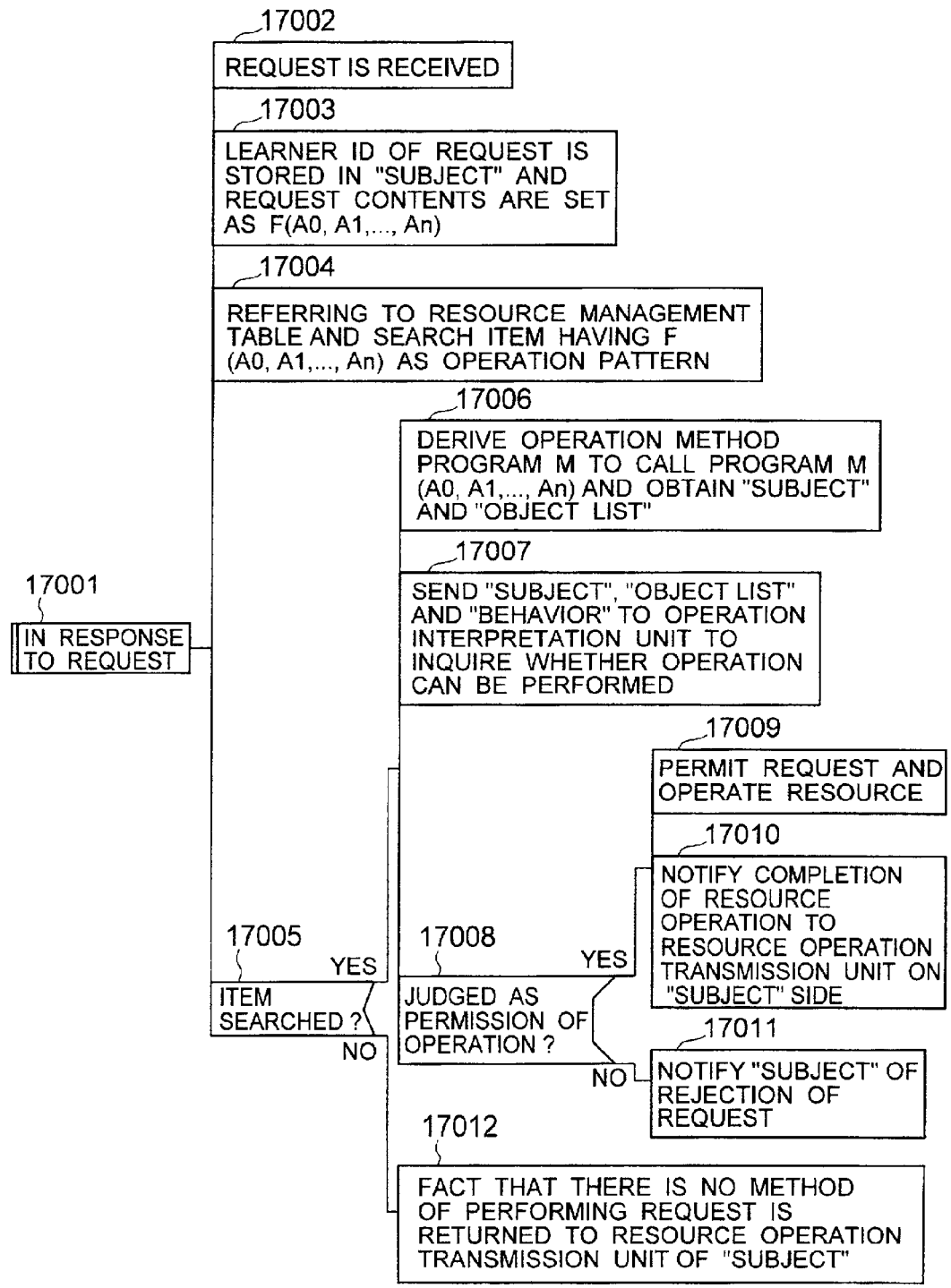

ROLE MANAGED COLLABORATIVE LEARNING SUPPORT SYSTEM AND METHOD

BACKGROUND OF THE INVENTION

The present invention relates to a collaborative learning support system in which a plurality of learners learn through collaborative works such as discussions via a network.

As such a collaborative learning support system, a system called "Belvedere" is known which has been developed by Pittsburgh University and is described in "Groupware for developing critical discussion skills" by D. Suthers, et al. (CSCL95 Computer Supported Collaborative Learning, Lawrence Erlbaum Associates, Inc., ISBN 0-8058-2243-7).

In the Belvedere system, a server manages structured discussion data which can be visually edited by a plurality of learners via a network. The structure data is data having a logical relation such as "Fact X supports hypothesis A", "Fact A offers evidence against hypothesis B" and "C and D are required to be verified, in order to verify A". Learners connected to the server via the network constitute a virtual group, and sequentially write discussions in discussion data shared on the server side. With this system, learners can debate in this manner on the network so that they can acquire scientific reasoning abilities, communication skills or the like.

SUMMARY OF THE INVENTION

Conventional collaborative learning support systems such as Belvedere are, however, associated with following insufficient considerations:

(1) Access privilege management by role should be done flexibly.

Access privilege to shared data on a server is required to be managed for collaborative works. Although Belvedere performs exclusive control, it does not perform access privilege management by roles of learners. Even in a system which performs management by role, the relation between role and access privilege is fixed and flexible access privilege management for each theme cannot be made.

(2) Learning progress status cannot be monitored.

There is no means for expressing the intention of a teacher who designed collaborative learning processes. Therefore, the computer system cannot judge whether activities of a learning group progress in the way the teacher intended. The teacher is therefore required to carefully observe the history of data exchange between learners.

(3) In the Belvedere system, learners can only perform group works of editing a set of figures coupled by links managed by the server. The figures represent only discussions so that it is difficult to utilize these figures for collaborative learning of another theme which requires group works of another kind.

It is an object of the present invention to provide a collaborative learning support system capable of solving the above-described problems.

According to one aspect of the present invention, there is provided a role managed collaborative learning support system for collaborative learning between a learning management server and a plurality of clients via a network, wherein: the client comprises resource operation transmission means and resource display means, the resource transmission means transmitting a request for a resource operation together with a learner ID for identifying a learner using the client, to the learning management server; the learning management server comprises resource operation means for operating resources of the learning management sever in accordance with the request by the client, resource reference means for notifying the client of the contents of the resources, and operation interpretation means for interpreting the meaning of the resource operation request sent to the resource operation means; the learning management server further comprises activity model data representative of a set of role names and a set of links indicating behaviors between the role names, a role table storing a correspondence of each learner ID and resource relative to each role name, and an operation interpretation table to be used for interpreting the request sent from the resource operation transmission means of the client to the resource operation means as behaviors between the resources; the resource operation means of the learning management server converts the request sent from the resource operation transmission means of the client into behavior descriptive data representative of behaviors between resources and learner ID's by using the operation interpretation table, and inquires the operation interpretation means whether an operation corresponding to the behavior descriptive data is permitted; the operation interpretation means refers to the role table to check whether there is a role name assigned to the learner ID and resource and being coincident with the contents of the activity model data to thereby judge whether the request is permitted, and returns judgment results to the resource operation means; and if the judgment results indicate a permission, the resource operation means operates the resource, and the resource display means of the client receives resource operation results from the resource operation means and displays the resource operation results.

According to the invention, by setting the activity model data, role table and operation interpretation table, an access privilege to resources can be set in accordance with the activity model data.

Other objects, features and advantages of the present invention will become apparent from the description of the embodiments of the invention taken in conjunction with the accompanying drawings.

BRIEF DESCRIPTION OF THE DRAWINGS

FIG. 4 shows the data structure of an operation interpretation table.

FIG. 5 shows the data structure of activity model data.

FIG. 7 shows the data structure of an activity log.

FIG. 9 shows a learning progress monitoring window used mainly for roles.

FIG. 10 shows the data structure of monitoring condition data.

FIG. 12 shows the data structure of resource management procedure data.

FIG. 17 is a structured chart illustrating an operation of a resource operation unit of a plug-in type.

DETAILED DESCRIPTION OF THE EMBODIMENTS

Figure 1:
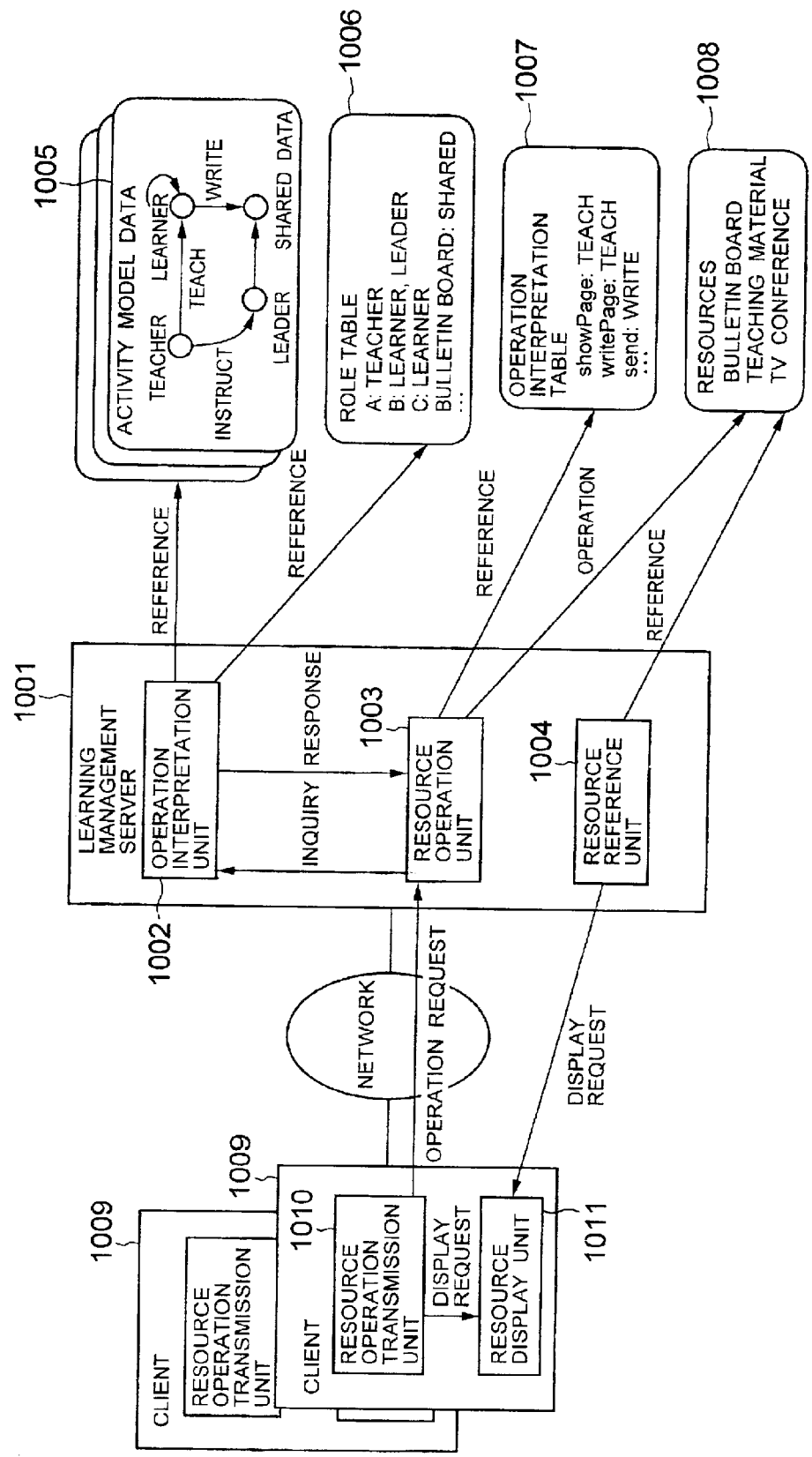
FIG. 1 is a block diagram showing the structure of a role managed collaborative learning support system according to an embodiment of the invention.

The invention will be described in detail in connection with embodiments. FIG. 1 shows the structure of a system according to an embodiment of the invention. A learning management server 1001 includes a resource operation unit 1003, a resource reference unit 1004 and an operation interpretation unit 1002. In order to control the operation of the server 1001, the server 1001 has activity model data 1005, a role table 1006 and an operation interpretation table 1007 which will be detailed later.

The learning management server 1001 has also various resources 1008 which are operated by clients 1009. The resources include a bulletin board on which messages of learners are written, a TV conference system for conversation by learners, and the like. A learner accesses the resource operation unit 1003 of the learning management server 1001 from the client 1009 via a network. Collaborative works by a learner group are performed by operating the resources 1008.

The client 1009 has a resource operation transmission unit 1010 and a resource display unit 1011. Each learner is assigned a learner ID which is used for identifying the learner.

First, a learner issues a request for operating the resource 1008 of the learning management server 1001 from the resource operation transmission unit 1010 of the client 1009. This request includes the learner ID as a subject and writeTo (bulletin board, title, contents) as the request contents.

In response to the request, the resource operation unit 1003 operates the resource 1008 managed by the learning management server 1001, and this operation of the resource operation unit 1003 is notified to the requested resource operation transmission unit 1010. The resource operation transmission unit 1010 requests the resource display unit 1011 to display the request result. The resource display unit 1011 requests the resource reference unit 1004 of the learning management server 1001 to acquire the contents of the resource which are then displayed on the client 1009 side. In this manner, a plurality of clients can access the resource 1008 of the learning management server 1001 to perform collaborative activities between the learners.

Next, an operation of managing access privilege to the resource 1008 will be described which is performed by the operation interpretation unit 1002 in accordance with the role of each learner. First, the data to be used for controlling the system will be described. The activity control data 1005 is data representative of a relation between participants such as a teacher and learners and a relation between resources. The learner ID is also called a resource hereinunder.

Figures 2, 3:
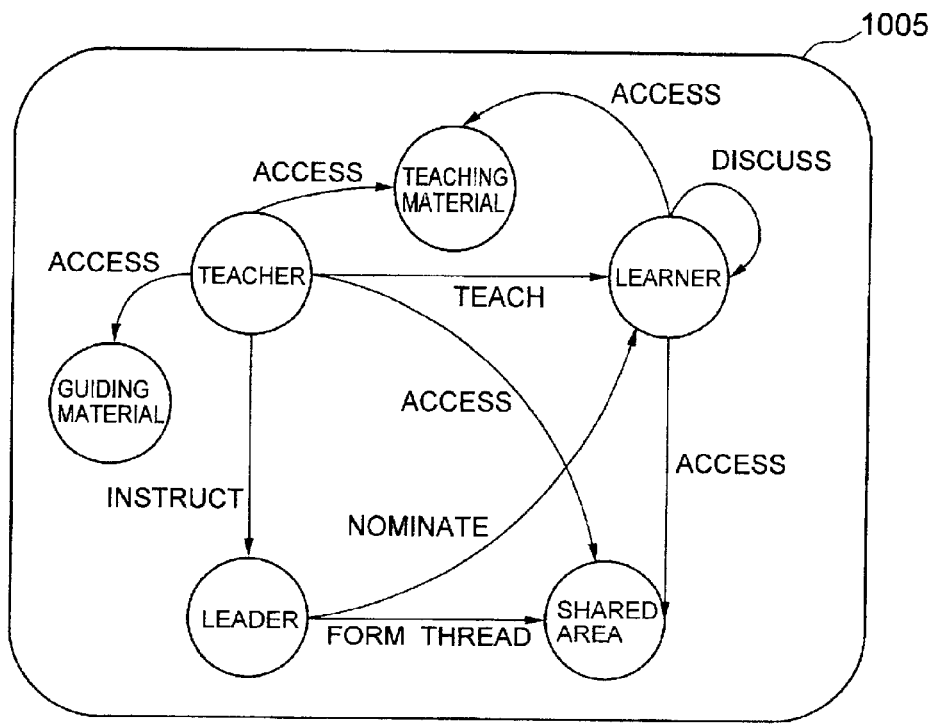
FIG. 2 is a conceptual diagram of activity model data.
FIG. 3 shows the data structure of a role table.

FIG. 2 shows the contents described by the activity model data 1005. The activity model data includes a plurality of named nodes called roles and a plurality of named links interconnecting the nodes. In the example shown in FIG. 2, a link named "access" is extended from a node named "teacher" to a node named "teaching material". This means that the role named "teacher" can perform an activity named "access" relative to the resource having the role named "teaching material". Other links are also interpreted in similar manners.

FIG. 5 shows the data structure of the activity model data 1005. This data structure is a table having a "behavior name" field, a "subject" field and an "object list" field. Although each record of the "object list" has a single element in many cases, it may have no element or a plurality of elements. In the last record of the object list shown in FIG. 5, two elements are described. This record "Subject: leader, Behavior name: role allocation, Object list: learner, task data" with two roles in the object list indicates that the "leader" can perform a "role allocation" relative to the "learner" and can write the result as the "task data".

FIG. 3 shows the data structure of the role table 1006. In this table, a "role" can be written in each of a plurality of models for each "resource ID". A learner ID or a resource name is written as the "resource ID". A set of roles assignable to the "resource ID's" of each model is written in the "role" field. This table is used for assigning roles to the learners ID's and resources in the "resource ID" field. The first record of the table shown in FIG. 3 is "Resource ID: user A, roles of the first model: leader, learner" which indicates that the "leader" or "learner" is assigned as the role of the learner ID "user A".

FIG. 4 shows the data structure of the operation interpretation table 1007. This table has three fields including an "operation pattern" field, a "behavior" field and an "object list" field. This table indicates that if the operation request sent from the resource operation unit 1003 matches an operation pattern, the operation described in the "behavior" field is performed with respect to the object written in the "object list" field.

Figure 13:
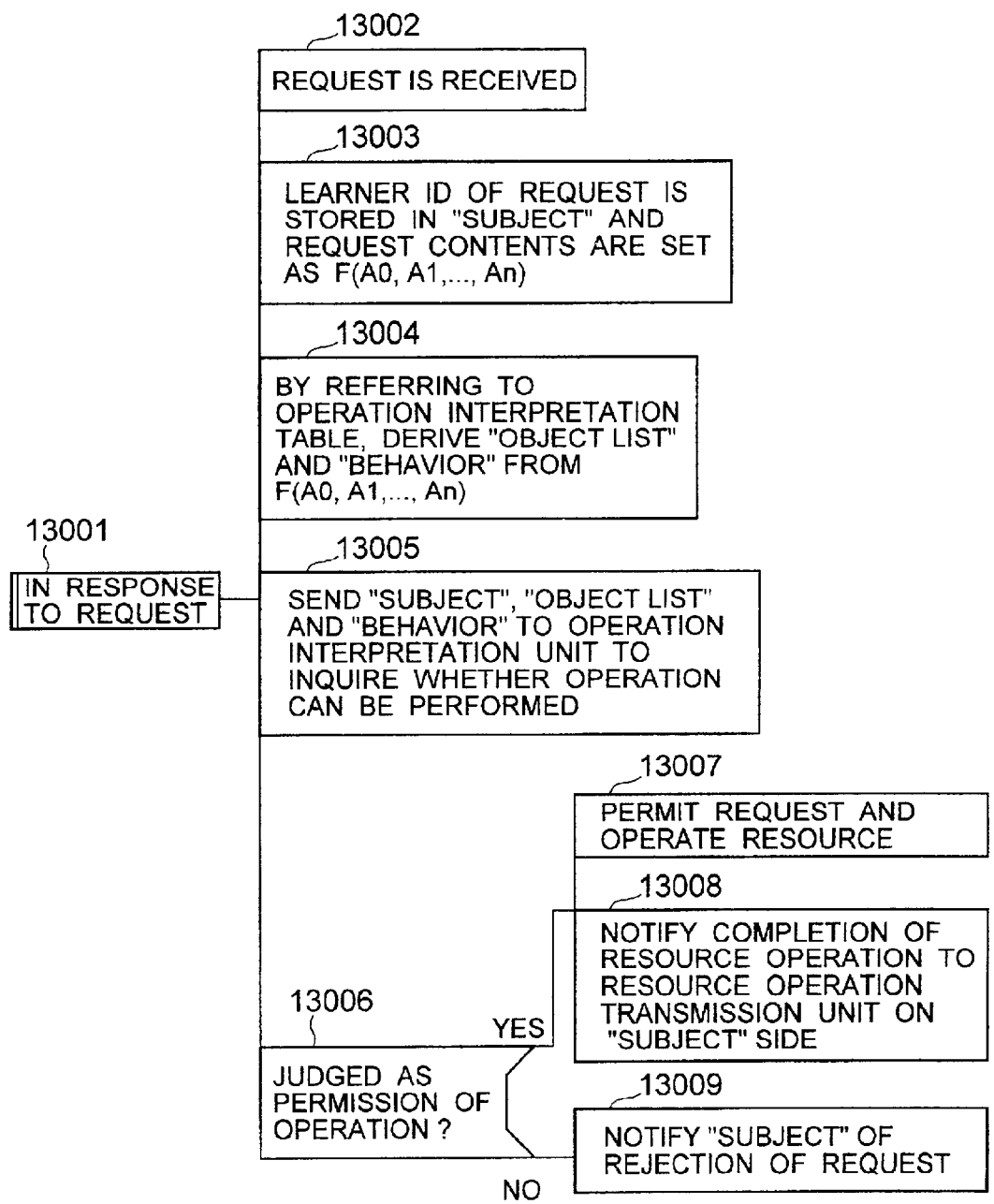
FIG. 13 is a structured chart illustrating an operation of a resource operation unit.

With reference to the above-described data, the operation of the resource operation unit 1003 will be described in detail with reference to the above-described data structures and FIG. 13. At Step 13001, each time when a request for a resource operation is input from a client, the resource operation unit 1003 executes a series of Steps starting from Step 13002.

First, at Step 13002 a "REQUEST" is received. At Step 13003 the learner ID of REQUEST is stored in the "subject" and the request contents are set as F(A0, A1, . . . , An). At Step 13004 by referring to the operation interpretation table 1007, the "object list" and "behavior" are derived from F(A0, A1, . . . , An).

Next at Step 13005 the "subject", "object list" and "behavior" are sent to the operation interpretation unit 1002 to inquire whether the operation can be permitted. At a condition judgment Step 13006 it is judged whether the results indicate that the operation can be permitted (refer to FIG. 14). If this judgment is asserted, it means that it is judged that the operation interpretation unit 1002 can perform the operation and that the resource 1008 is actually operated in a series of processes at Step 13007 and following Steps. At Step 13008 the resource operation transmission unit 1010 on the "subject" side is notified of the completion of the resource operation. If it is judged at the judgment Step 13006 that the judgment is negated, then at Step 13009 it is notified via the resource operation unit 1003 that the REQUEST" of the client 1009 of the "subject" cannot be performed.

Figure 14:
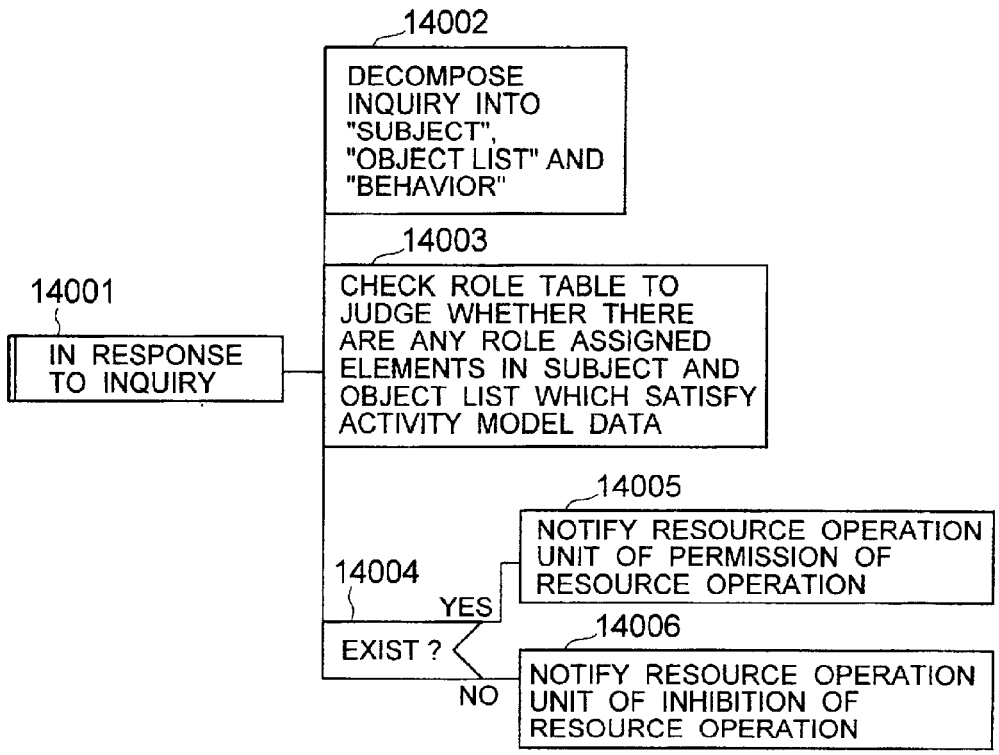
FIG. 14 is a structured chart illustrating an operation of an operation interpretation unit.

Next, with reference to FIG. 14, the operation of the operation interpretation unit 1002 will be detailed. At Step 14001, each time when an inquiry is sent from the resource operation unit 1003, the operation interpretation unit 1002 executes a series of Steps starting from Step 14002 to respond the inquiry.

First, at Step 14002 the inquiry is decomposed into the "subject", "object list" and "behavior". At Step 14003 the role table 1066 is checked to judge whether there are any assigned role elements of the subject and object list which satisfy the activity model data 1005. Satisfying the activity model data 1005 means that a link from the "subject" node named "behavior" to the element "object list" exists in the activity model data 1005.

If it is judged at a condition judgment Step 14004 that the link exists, it means that the operation can be permitted so that at Step 14005 the resource operation unit 1003 is notified of a permission of the operation. If the judgment Step 14004 is negated, then at Step 14006 the resource operation unit 1003 is notified of an inhibition of the operation.

Figure 15:
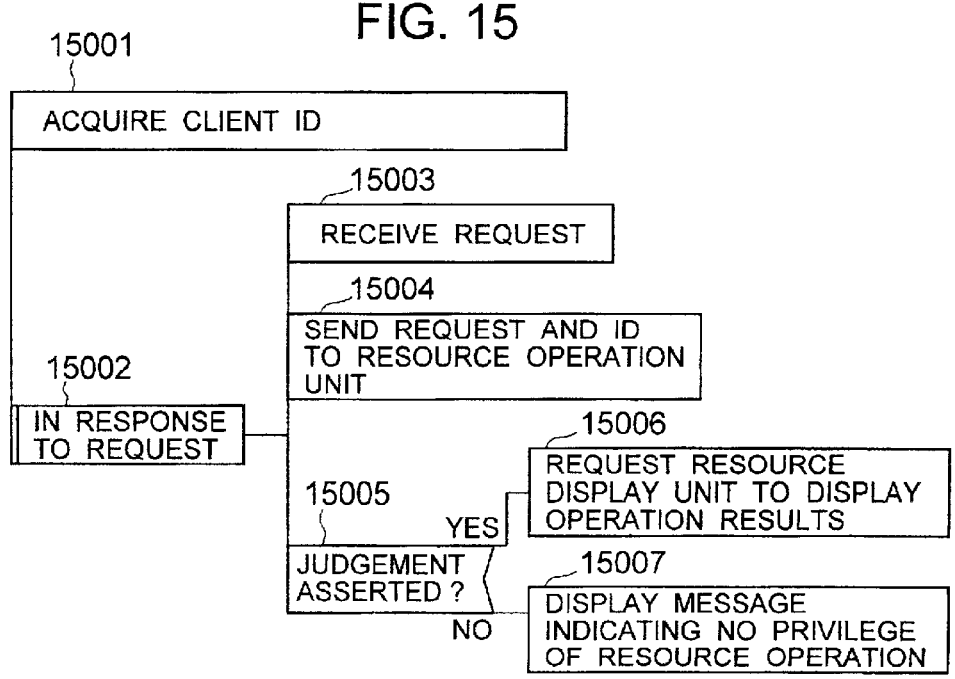
FIG. 15 is a structured chart illustrating an operation of an operation transmission unit.

Next, with reference to FIG. 15, the operation of the operation transmission unit 1010 on the client 1009 side will be detailed. First, at Step 15001 the client ID is acquired. The client ID may be assigned beforehand or it may be assigned by the server when the client logs in by using a user name. In either case, it is assumed that the learner ID is assigned to each learner.

At Step 15002 each time a user enters REQUEST, a series of processes starting from Step 15003 is performed. First, at Step 15003 REQUEST is received.

Next, at Step 15004 REQUEST and ID are sent to the resource operation unit 1003. It is checked whether a condition judgment Step 15005 asserts. If the judgment Step asserts, then at Step 15006 the resource display unit 1011 is requested to display the operation results. If the judgment Step 15005 negates, then at Step 15007 a message that there is no privilege for operating the resource is displayed.

With the above processes, it is possible to provide a collaborative learning support system capable of freely setting role and privilege in accordance with the settings of the activity model data 1003.

Figure 6:
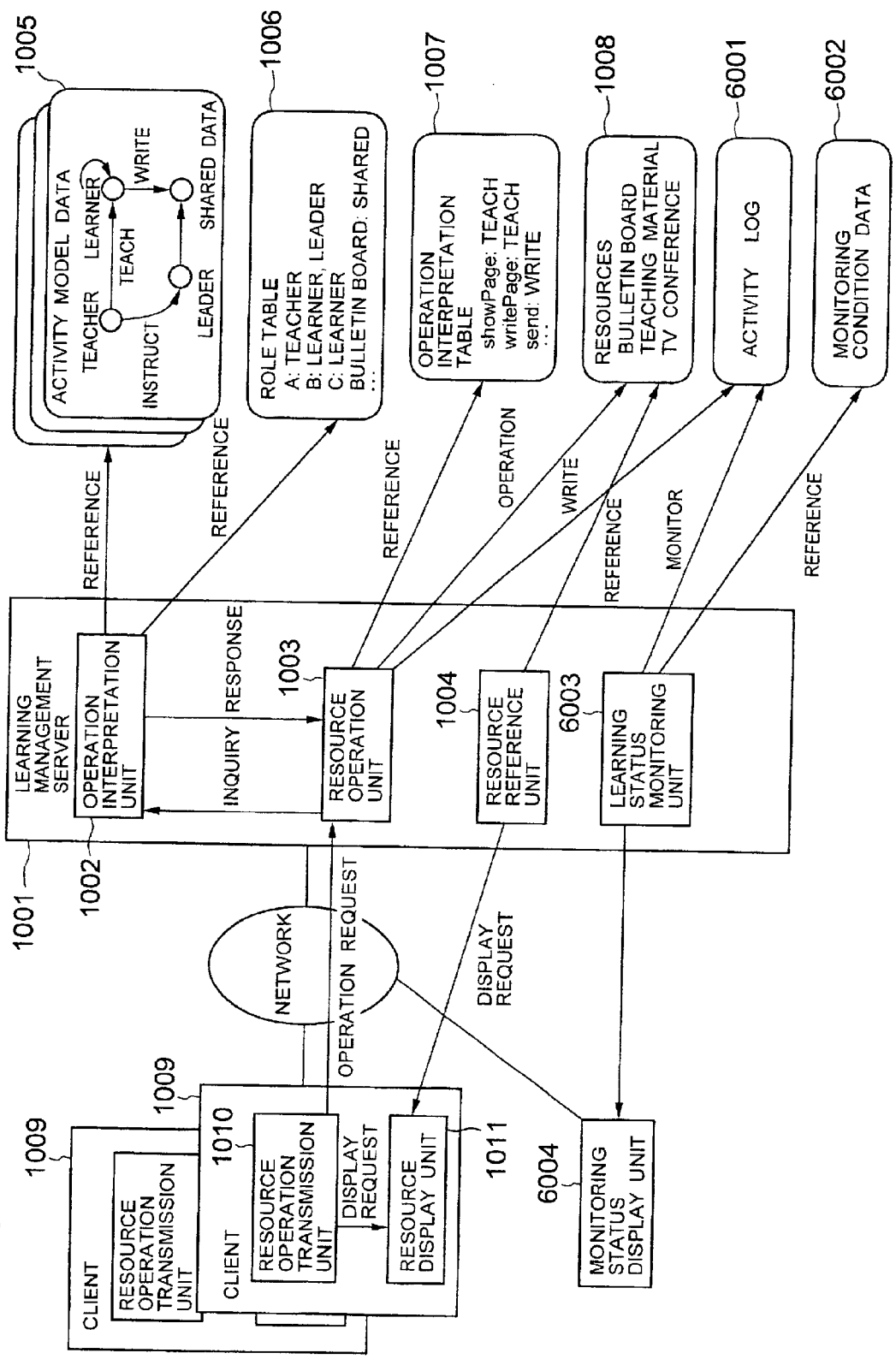
FIG. 6 is a block diagram showing the structure of a collaborative learning support system with a learning progress monitoring function according to another embodiment of the invention.

Next, with reference to FIG. 6, a collaborative learning support system having a function of monitoring the operation status of a learner will be described. In the system shown in FIG. 6, in addition to the constituent elements shown in FIG. 1, the learning management server 1001 is provided with a learning status monitoring unit 6003, an activity log 6001 and monitoring condition data 6002. These unit, log and data are added in order for a monitoring status display unit 6004 to receive a display request from the learning status monitoring unit 6003 via the network.

FIG. 7 shows the data structure of the activity log 6001. This data structure has fields "behavior name", "subject", "object list", "count" and "history". The data structure of the "behavior name", "subject" and "object list" fields is the same as the data structure 5001 of the activity model data 1005. The "count" field is used for storing the number of behaviors performed by the client. The "history" field is used for sequentially storing behaviors performed by the client 1009.

Figure 8:
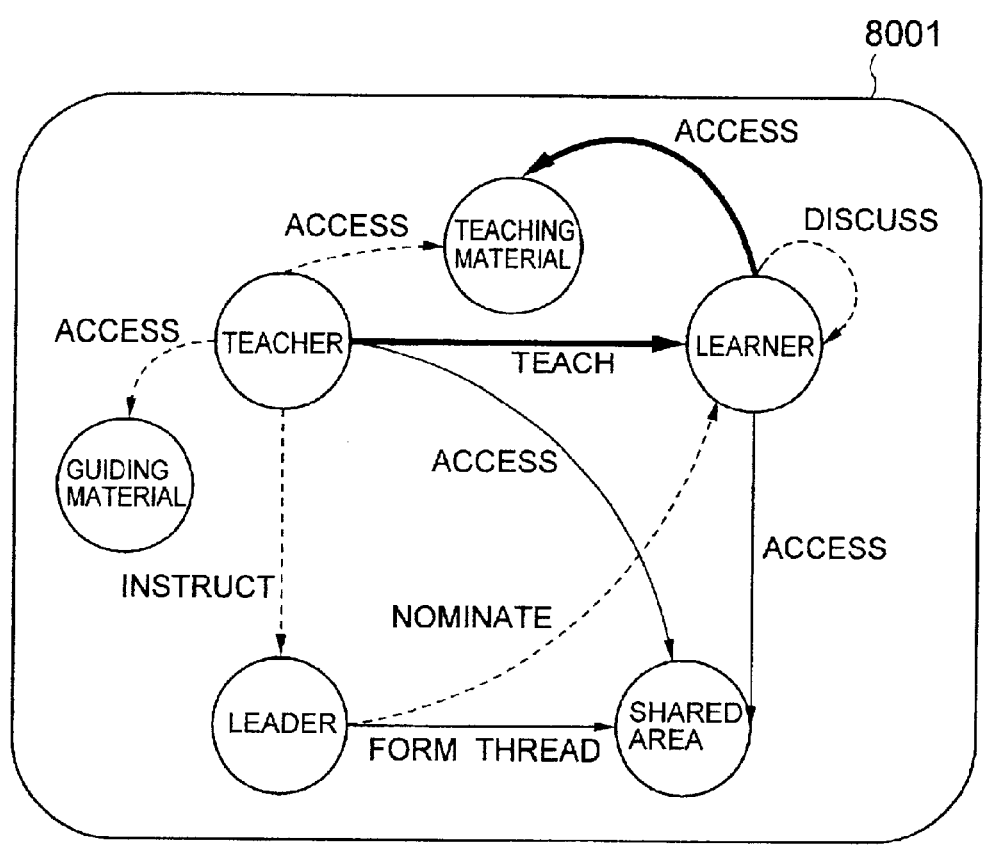
FIG. 8 shows a learning progress monitoring window used mainly for operations.

FIG. 8 shows how the number of behaviors stored in the activity log 6001 is displayed by the monitoring status display unit 6004. In this example, the link "teach" from the "teacher" to "learner" is displayed bold. This means that the behavior "teach" was performed a number of times between these roles. The link "access" from the "teacher" to "learning material" is displayed as a broken line. This means that the behavior "access" was scarcely performed. The thickness of a link to be displayed can be determined from the number of counts in the "count" field of the activity log 6001 sent from the learning status monitoring unit 6003 to the monitoring status display unit 6004.

FIG. 9 shows an example of a bar graph showing the number of executed roles at each resource ID displayed by the monitoring status display unit 6004. This display can be realized by making the learning status monitoring unit 6003 calculate the number of roles assigned to the resource of each "subject" by using the "history" of the activity log 6001.

FIG. 10 shows the data structure of the monitoring condition data 6002. In the example shown in FIG. 10, the restrictions of the lapse time and activity number of each role corresponding to each resource ID can be written by a logic formula.

Figure 16:
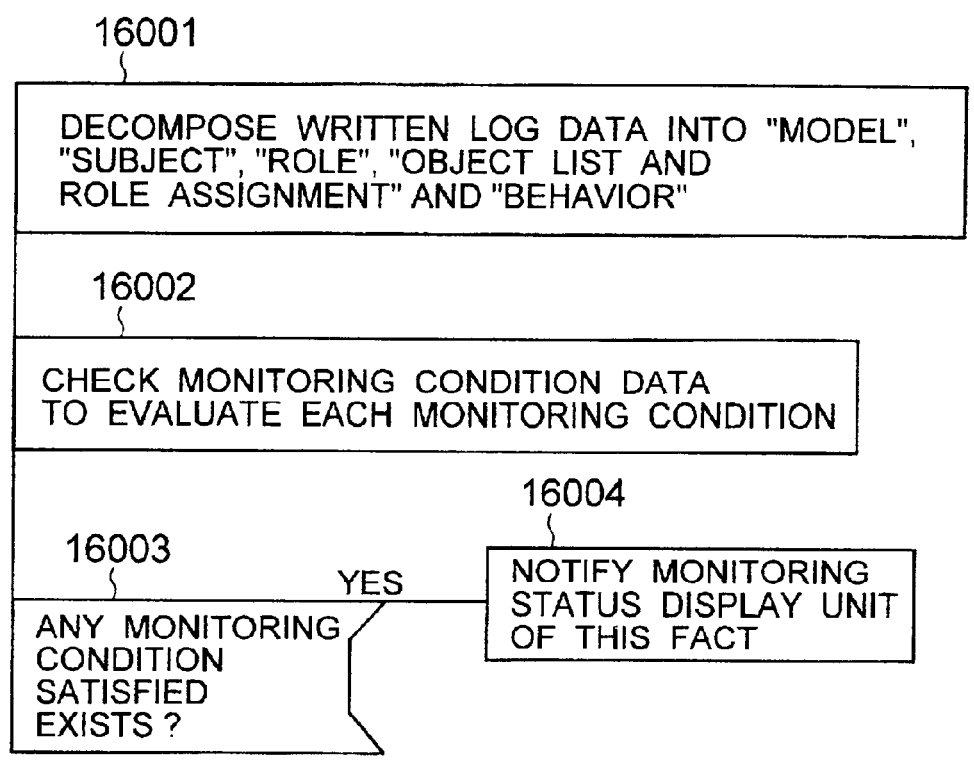
FIG. 16 is a structured chart illustrating an operation of a learning progress monitoring unit.

Next, with reference to FIG. 16, how the learning status monitoring unit 6003 utilizes the monitoring condition data 6002 will be detailed. First, at Step 16001 the log data written in the activity log 6001 is decomposed into "model", "subject", "role", "object list and role assignment" and "behavior". Next, at Step 16002 the monitoring condition data 6002 is checked to evaluate each monitoring condition.

Lastly at a condition judgment Step 16003 it is checked whether there is any monitoring condition satisfied. If there is any monitoring condition satisfied, then at Step 16004 this fact is notified to the monitoring condition display unit. In this manner, even if the teacher does not check the learning status of each learner, a collaborative learning support system capable of monitoring learners can be configured only by writing the monitoring conditions.

Although the monitoring condition is set to each role corresponding to the learner ID as shown in the monitoring condition data of FIG. 10, a table having only the "role" and "monitoring condition" fields may be used. In this case, generally the monitoring condition can be set to the role. For example, the monitoring condition of the behavior of the role "leader" can be set.

Figure 11:
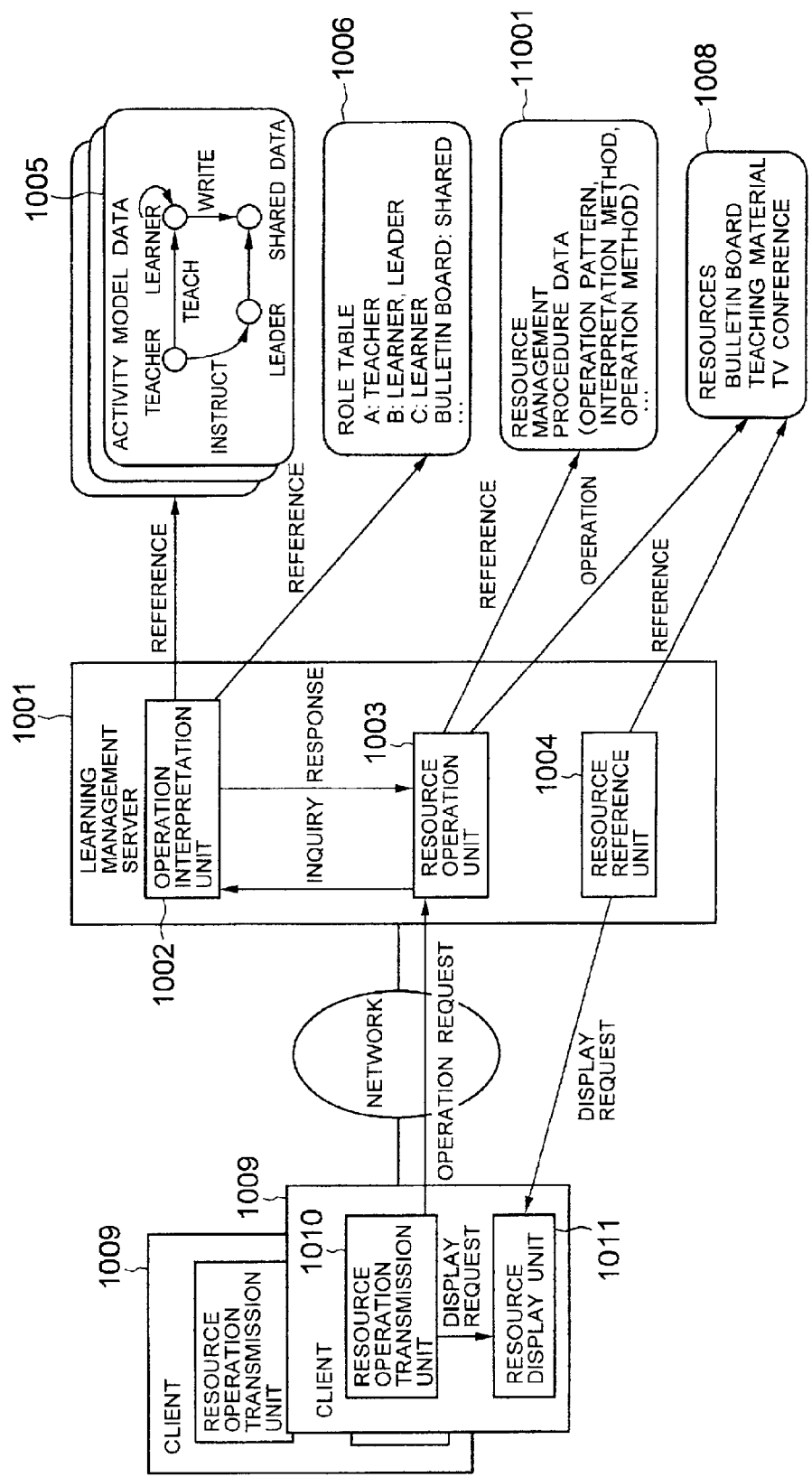
FIG. 11 is a block diagram showing the structure of a collaborative learning support system with a resource operation plug-in function according to another embodiment of the invention.

Next, with reference to FIG. 11, a collaborative learning support system capable of implementing various resource operations will be described. In FIG. 11, the operation interpretation table 1007 shown in FIG. 1 is not used but a resource management procedure table 11001 is used. The data structure of this table is shown in FIG. 12. The resource management procedure table 11001 has three fields "operation pattern", "interpretation method" and "operation method". The "operation pattern" is a pattern of a request for a resource operation sent from the client 1009. The "interpretation method" is a function for returning the "object list" and "behavior" in response to the request. The "operation method" field stores a function of operating a resource.

Lastly, with reference to FIG. 17, the operation of the resource operation unit 1003 will be detailed. At Step 17001, each time when a request for a resource operation is input from a client, the resource operation unit 1003 executes a series of Steps starting from Step 17002. First, at Step 17002 "REQUEST" is received. At Step 17003 the learner ID of REQUEST is stored in the "subject" and the request contents are set as F(A0, A1, . . . , An). At Step 17004 by referring to the resource management procedure table 11001, an item having F(A0, A1, . . . , An) as the operation pattern is searched. At a condition judgment Step 17005 it is checked if such an item exists. If this judgment Step is asserted, a series of processes starting from Step 17006 is performed to operate the resource.

First, at Step 17006 an operation method program M is derived from the searched item to call the program M(A0, A1, . . . , An) and obtain the "subject" and "object list". At Step 17007 the "subject", "object list" and "behavior" are sent to the operation interpretation unit 1002 to inquire whether the operation can be permitted. At a condition judgment Step 17008 it is judged whether the results indicate that the operation can be permitted. If this judgment is asserted, a series of processes starting from Step 17009 is performed to operate the resource.

At Step 17009 the REQUEST is permitted and the resource is operated. At Step 17010 the resource operation transmission unit 1010 on the "subject" side is notified of the completion of the resource operation. If it is judged at the judgment Step 17008 that the judgment is negated, then at Step 17011 the "subject" is notified that the REQUEST" of the client 1009 cannot be performed. If the judgment Step 17005 is negated, then at Step 16012 the fact that there is no method for performing the REQUEST is returned to the resource operation transmission unit of the "subject". In this manner, the interpretation of the REQUEST" can be performed by utilizing the resource operation registered for the resource operation unit 1003 and the activity model data. Different types of resource operations can therefore be added as desired.

According to the present invention, an access privilege of a learner to shared resources can be decided by referring to the activity model data describing the relation between roles and the learner role assignment. Flexible access control is therefore possible. The collaboration status of learners can be monitored efficiently by using roles and behaviors stored as the activity model data. Since new resource operations can be added, a collaborative learning support system capable of various collaborative works can be provided.

It will be further understood by those skilled in the art that the foregoing description has been made on embodiments of the invention and that various changes and modifications may be made in the invention without departing from the spirit of the invention and scope of the appended claims.

What is claimed is:

1. A role managed collaborative learning support system for collaborative learning between a learning management server and a plurality of clients via a network, wherein:

each of said plurality of clients comprises resource operation transmission means and resource display means, said resource operation transmission means transmitting a request for operating resources the learning management server manages together with a user ID for identifying a user using one of said plurality of clients, to said learning management server;

said learning management server comprises resource operation means for operating the resources in accordance with both the request for operating resources and a judgment taking the user into consideration, resource reference means for notifying said client of the contents of the resources, and operation interpretation means for interpreting the resource operation request sent from each of said plurality of clients;

said learning management server further comprises activity model data representative of a set of links including a plurality of combinations of roles and behaviors performed between the roles, a role table storing a correspondence of each user ID and resource relative to each role, and an operation interpretation table to be used for converting the request into behavior descriptive data indicating behavior for the resource performed by the client;

said resource operation means of said learning management server converts the request from the client into the behavior descriptive data by referring to the operation interpretation table, transmits the behavior descriptive data, the user ID and a resource identifier included in the request to the operation interpretation means and inquires said operation interpretation means whether an operation represented by the converted data is permitted;

said operation interpretation means of the learning management server refers to said role table to check whether there is a combination of role name, the user ID corresponding thereto and a resource in the activity model data to thereby judge whether the request is permitted, and returns judgment results according to the judgment to said resource operation means; and if the resource operation means receives judgment results indicating a permission, said resource operation means operates the resource, and said resource display means of said client receives resource operation results from said resource operation means and displays the resource operation results.

2. A role managed collaborative learning support system according to claim 1, wherein a plurality of activity model data sets is provided within the learning management server, and said operation interpretation means notifies said resource operation means of a permission of a request operation if the behavior descriptive data is coincident with any one of the activity model data sets.

3. A role managed collaborative learning support system according to claim 2, wherein:

a monitoring status display means is connected to the network;

said learning management server comprises an activity log for storing behavior interpretation data including the behavior descriptive data of the request for operating sent from the client and role name assignment when there is a match with the activity model data, and said resource operation means writes the behavior interpretation data when the resource is operated; and said learning management server comprising a learning status monitoring means, said learning status monitoring means making said monitoring status display means display the contents of the activity log.

4. A role managed collaborative learning support system according to claim 3, wherein said learning management server comprises monitoring condition data, said learning status monitoring means evaluates a condition in the monitoring condition data when the activity log changes, and if the evaluated condition is satisfied, notifies this fact to said monitoring status display means, and said monitoring status display means displays an activity status.

5. A role managed collaborative learning support system according to claim 2, wherein:

said learning management server comprises a resource management procedure table in place of the operation interpretation table; and said resource management procedure table has a plurality of resource operation specification data sets each including an operation pattern, an interpretation method and an operation method, and said resource operation means searches the resource operation specification data having the operation pattern matching the request for operating from said client, executes the corresponding interpretation method to form behavior interpretation data, inquires said operation interpretation means whether an operation corresponding to the behavior interpretation data is permitted, and if permitted, operates the resource by using the operation method written in the resource operation specification data.

6. The role managed collaborative learning support system according to claim 3, wherein the learning status monitoring means counts a number of the behavior interpretation data, and the monitoring status display means displays the link in the activity model data in a bolded state as the number counted by the learning status monitoring means increases.

7. A resource access privilege management server for collaborative learning between a learning management server and a plurality of clients via a network, said server comprising:

an activity model data representative of a set of links including a plurality of combinations of roles and behaviors performed between the roles;

a table storing an information on correspondence among user IDs assigned to users using the clients, role names, and resource identifiers respectively assigned to resources managed by the server;

an operation table storing an information on a relationship between a request from a client for operating resources sent to the server and names of the behaviors performed by users for the resources;

a first converting means for converting the request from the client into the names of the behaviors;

a second converting means for converting user IDs sent from the clients into the role names, and further converting the resource identifiers into the role names; and a resource access privilege determining means for determining a privilege for accessing the resources according to the request for operating if the activity model data includes a combination of the behavior names corresponding to the request for operating from the client, the role name corresponding to a user ID sent from the client and a resources identifier included in the request for operating.

8. A resource access privilege management method for collaborative learning between a learning management server and a plurality of clients via a network, the method comprising steps of:

preparing 1) an activity model data representative of a set of links including a plurality of combinations of roles and behaviors performed between the roles, 2) a table storing an information on correspondence among user IDs assigned to each user using the clients, role names, resource identifiers respectively assigned to resources managed by the server and 3) an operation table storing an information on a relationship between a request from a client for operating resources sent to the server and names of the behaviors performed by users for the resources;

converting the request from the client into the names of the behaviors;

further converting user IDs sent from the clients into the role names, and further converting the resource identifiers into the role names; and determining a privilege for accessing the resources according to the request for operating if the activity model data includes a combination of the behavior names corresponding to the request for operating sent from the client, the role name corresponding to a user ID sent from the client and a resource identifier included in the request for operating.

9. A computer-readable medium containing a computer executable program to be executed on a resource access privilege management server for collaborative learning between a learning management server and a plurality of client via network, the program comprising the steps of:

preparing 1) an activity model data representative of a set of links including a plurality of combinations of roles and behaviors performed between the roles, 2) a table storing an information on correspondence among user IDs assigned to each user using the clients, role names, and resource identifiers respectively assigned to resources managed by the server and 3) an operation table storing an information on a relationship between a request from a client for operating resources sent to the server and names of the behaviors performed by the users for the resources;

converting the request from the client into the names of the behaviors;

further converting user IDs sent from the clients into the role names, and further converting the resource identifiers into the role names; and determining a privilege for accessing the resources according to the request for operating if the activity model data includes a combination of the behavior names corresponding to the request for operating sent from the client, the role name corresponding to a user ID sent from the client and a resource identifier included in the request for operating.

* * * * *